No. 746,068. PATENTED DEC. 8, 1903.
W. H. GILBERT.
HAND DEVICE FOR HOLDING EMERY WHEEL DRESSERS.
APPLICATION FILED MAR. 7, 1903.
NO MODEL.

Witnesses:
W. B. Nourse.
E. N. Barker.

Inventor:
Wallace H. Gilbert.
By A. H. Barker, Att'y.

THE NORRIS PETERS CO., PHOTO-LITHO., WASHINGTON, D. C.

No. 746,068. Patented December 8, 1903.

UNITED STATES PATENT OFFICE.

WALLACE H. GILBERT, OF WORCESTER, MASSACHUSETTS.

HAND DEVICE FOR HOLDING EMERY-WHEEL DRESSERS.

SPECIFICATION forming part of Letters Patent No. 746,068, dated December 8, 1903.

Application filed March 7, 1903. Serial No. 146,675. (No model.)

*To all whom it may concern:*

Be it known that I, WALLACE H. GILBERT, of the city and county of Worcester and State of Massachusetts, have invented certain new and useful Improvements in Hand Devices for Holding Emery-Wheel Dressers; and I do hereby declare that the following is a full, clear, and exact description thereof, reference being had to the accompanying drawings, forming a part of this specification, and in which—

Figure 1:
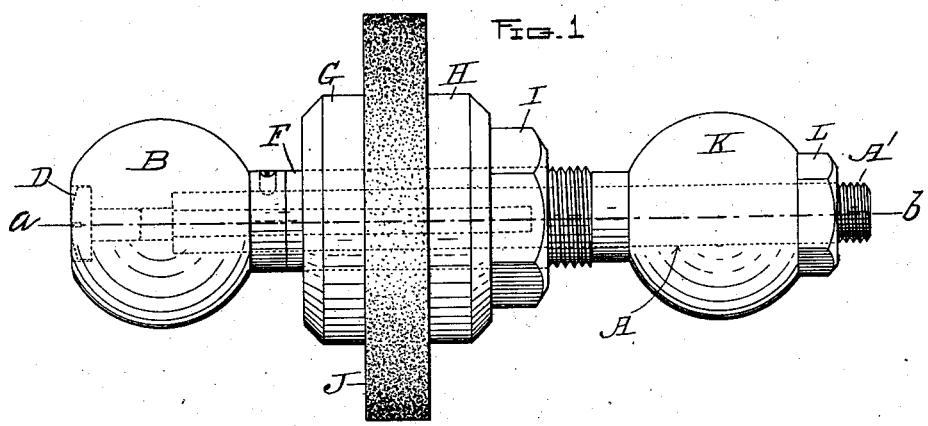
Figure 2:
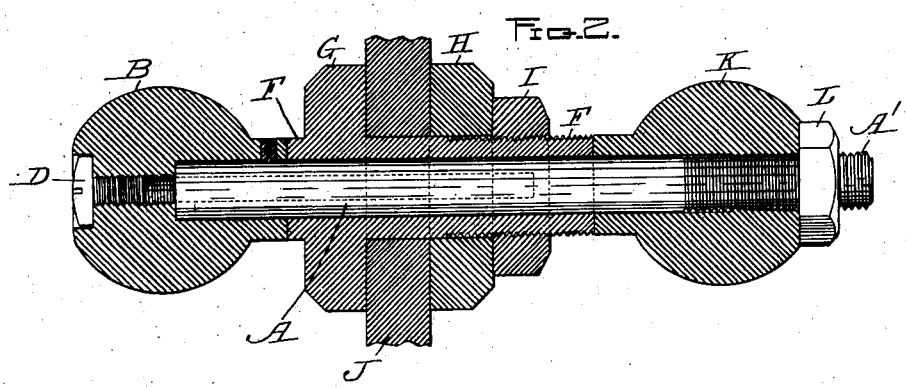
Figure 3:
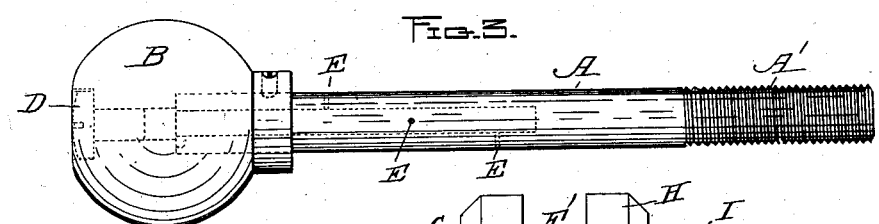
Figure 4:
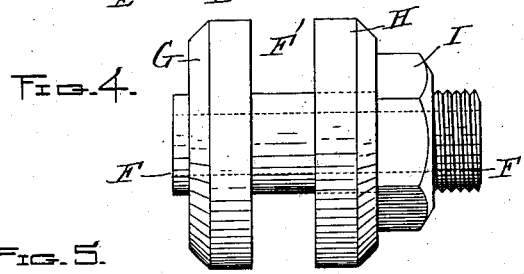
Figure 5:
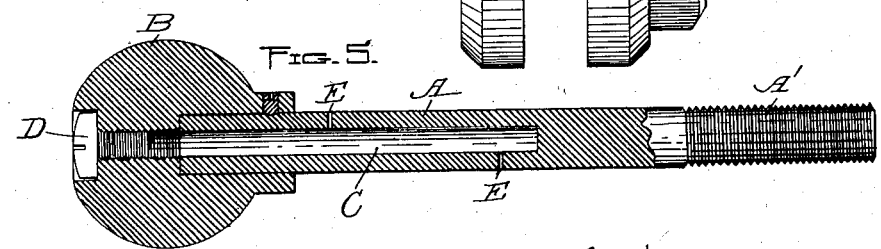

Figure 1 represents a side view of my said improved hand device for holding emery-wheel dressers. Fig. 2 is a central longitudinal section, partly in elevation therethrough, taken on line $a\ b$, Fig. 1. Fig. 3 is a side view of the central hollow threaded spindle of the device having one of the handles of said device mounted on one end. Fig. 4 is a side view of the threaded sleeve which is fitted on said spindle and upon which are mounted a fixed collar or transverse annular flange, a loose collar and a holding-nut, as hereinafter described; and Fig. 5 is a central longitudinal section through the parts shown in Fig. 3.

The object of my invention is to provide a device which is constructed so that an emery-wheel dresser may be applied thereto and held securely and which device may be held in the hands by means of suitable end handles to apply the dresser to the emery-wheel to be operated upon.

Said hand device comprises the following elements in combination: a central spindle, a portion of one end of which is threaded and its opposite end provided with a suitable handle, said handle end and part of the shank being made hollow to form an oil-chamber provided with a suitable stopper at the outer end, and with small transverse perforations in the shank to permit the oil to discharge from said chamber; a threaded sleeve mounted on said spindle, having a fixed and a loose collar thereon, also a holding-nut fitted over the threaded portion; a suitable removable handle fitted over the central spindle and abutting against the end of the aforesaid sleeve, and a check-nut for holding said removable handle in place after the emery-wheel dresser has been fitted in the device, as will be hereinafter more fully set forth.

To enable others to better understand the nature and purpose of my said invention, I will now proceed to describe it more in detail.

In the drawings, A represents the central spindle, before alluded to. Said spindle has formed or secured upon one end the handle B, and at its opposite end is formed the threaded portion A'. In the handle end is formed a central longitudinal opening, which extends part way into the shank of the spindle, as is best shown in Fig. 5, to form an oil-chamber C; the outer end being provided with a suitable stopper D to prevent the oil from discharging at said end, and the shank of the spindle is provided with several small transverse perforations E for the oil to discharge through to lubricate the sleeve F. Said sleeve F is fitted to turn upon said spindle A and has mounted thereon, at the end next to handle B, a fixed collar or transverse annular flange G. It also has a loose collar H and holding-nut I mounted thereon, the nut being outside said loose collar on the sleeve and fitted to turn on the threaded end of said sleeve. The loose collar H may be threaded or not, as desired. In the drawings it is shown with a smooth inner face, as it may thus be made cheaper and answers the purpose for which it is intended as well as though it were threaded.

The emery-wheel dresser J, consisting of an ordinary emery-wheel or any device suitable for dressing emery-wheels, is fitted over the sleeve F in the space F' between the fixed collar G and loose collar H.

Outside of the sleeve on spindle A is fitted a removable handle K, which is preferably threaded to turn on the threaded portion A' of the spindle, and outside of said handle is arranged a check-nut L, fitted to turn on the threaded end of the spindle and which serves to hold the handle in position after applying the dresser to the device and fitting the movable parts against the same, as is shown in the drawings. The handles B K are in this instance shown round, this being the most convenient form for use in practice; but I do not limit myself thereto; neither do I limit myself to the particular shape of the other parts.

A device constructed as shown and described it is obvious holds the dresser in a very secure and perfect manner and is easily manipulated in dressing emery-wheels.

If it is desired to substitute one dresser for another, it is simply necessary to remove the nuts L and I, slip the handle K and loose collar H off, substitute the desired dresser for the one removed, and then replace the removable parts in position again.

I am aware that a hand device for holding emery-wheel dressers is not broadly new and therefore limit my invention to the construction substantially as shown and described, and pointed out in the following claims. If desired, the oiling device may be left off without affecting the nature and purpose of my invention.

What I claim as new, and desire to secure by Letters Patent, is—

1. A hand device for holding emery-wheel dressers, comprising in combination, with said dresser the central spindle A, having the handle B mounted on one end and its other end threaded at A', also having a longitudinal oil-chamber in said handle end thereof, with a stopper at its outer end and suitable oil-discharge openings in the shank of the spindle; threaded sleeve F, fitted over said central spindle and having mounted thereon fixed collar G, loose collar H, and holding-nut I, in the positions described; said collars and nut; removable handle K, arranged outside of and next to said sleeve, and the check-nut L, fitted over the threaded end of the spindle, outside of said loose handle, substantially as and for the purpose set forth.

2. The combination of the emery-wheel dresser, central spindle A, having the handle B mounted on one end and its other end threaded at A', with threaded sleeve F fitted over said spindle and having mounted thereon fixed collar G, loose collar H, and holding-nut I, in the positions described; said collars and nut; removable handle K, arranged outside of and next to said sleeve, and the check-nut L, fitted over the threaded end of the spindle, outside of said loose handle, substantially as and for the purpose set forth.

WALLACE H. GILBERT.

Witnesses:
A. A. BARKER,
E. N. BARKER.